(12) United States Patent
Byun et al.

(10) Patent No.: US 11,677,270 B2
(45) Date of Patent: Jun. 13, 2023

(54) APPARATUS FOR GENERATING ELECTRICAL POWER FROM MOTION OF VEHICLE

(71) Applicant: KEPCO ENGINEERING & CONSTRUCTION COMPANY, INC., Gyeongsangbuk-do (KR)

(72) Inventors: Dong Hwa Byun, Gimcheon-si (KR); Yeon Uk Jeong, Hwaseong-si (KR)

(73) Assignee: KEPCO ENGINEERING & CONSTRUCTION COMPANY, INC., Gyeongsangbuk-do (KR)

( * ) Notice: Subject to any disclaimer, the term of this patent is extended or adjusted under 35 U.S.C. 154(b) by 0 days.

(21) Appl. No.: 17/555,766

(22) Filed: Dec. 20, 2021

(65) Prior Publication Data

US 2022/0200338 A1 Jun. 23, 2022

(30) Foreign Application Priority Data

Dec. 22, 2020 (KR) .......................... 10-2020-0181320

(51) Int. Cl.
*H02J 50/00* (2016.01)
*H02J 50/10* (2016.01)
*H02M 7/04* (2006.01)

(52) U.S. Cl.
CPC ............ *H02J 50/001* (2020.01); *H02J 50/10* (2016.02); *H02M 7/04* (2013.01)

(58) Field of Classification Search
CPC .......... H02J 50/001; H02J 50/10; H02M 7/00; B60L 1/00; B60L 3/00; B60L 5/00; B60L 7/00; B60L 8/00; B60L 9/00; B60L 15/00; B60L 50/00; H02N 2/185
See application file for complete search history.

(56) References Cited

U.S. PATENT DOCUMENTS

| 10,851,807 | B1* | 12/2020 | Bassi | F15B 7/003 |
| 2007/0085342 | A1* | 4/2007 | Horianopoulos | F03G 7/08 |
| | | | | 290/1 R |
| 2019/0044413 | A1* | 2/2019 | Mokoenene | F03G 7/08 |
| 2020/0287480 | A1* | 9/2020 | Giannotta | H01F 27/25 |

FOREIGN PATENT DOCUMENTS

| JP | 2001-241375 A | 9/2001 |
| JP | 2016-111899 A | 6/2016 |
| JP | 2016111899 A * | 6/2016 |

(Continued)

OTHER PUBLICATIONS

Korean Office Action (Application No. 10-2020-181320) dated May 18, 2022 (13 pages).

*Primary Examiner* — Rexford N Barnie
*Assistant Examiner* — Joseph N Inge
(74) *Attorney, Agent, or Firm* — Nixon Peabody LLP; Jeffrey L. Costellia (57) ABSTRACT

An apparatus for generating electric power from the motion of a vehicle according to the disclosure includes: a magnetic fluid storage unit in which a magnetic fluid is stored and from which the magnetic fluid is discharged by a pressing force of the vehicle; a pipe unit through which the magnetic fluid discharged from the magnetic fluid storage unit moves; and an induction coil unit arranged to surround a circumference of the pipe unit so that an induced electromotive force is generated when the magnetic fluid moves.

15 Claims, 9 Drawing Sheets

(56) References Cited

FOREIGN PATENT DOCUMENTS

| | | |
|---|---|---|
| KR | 2008-0018552 A | 2/2008 |
| KR | 2011-0105201 A | 9/2011 |
| KR | 10-1163989 B1 | 7/2012 |
| KR | 2012-0082724 A | 7/2012 |
| KR | 2017-0142908 A | 12/2017 |

* cited by examiner

APPARATUS FOR GENERATING ELECTRICAL POWER FROM MOTION OF VEHICLE

CROSS-REFERENCE TO RELATED APPLICATION

This application is based on and claims priority under 35 U.S.C. § 119 to Korean Patent Application No. 10-2020-0181320, filed on Dec. 22, 2020, in the Korean Intellectual Property Office, the disclosure of which is incorporated by reference herein in its entirety.

BACKGROUND

1. Field

The disclosure relates to an apparatus for generating electric power from the motion of a vehicle, and more particularly, to an apparatus for generating electric power by generating a change in a magnetic force while a pressing force from the vehicle is transmitted to a magnetic fluid storage unit and a magnetic fluid discharged from the magnetic fluid storage unit moves along a pipe unit and an induced electromotive force is generated in an induction coil unit outside the pipe unit.

2. Description of the Related Art

As society is modernized, the demand for power energy is increasing, and attempts are being made to generate eco-friendly small and medium-sized power in addition to large power plants such as nuclear power and coal-fired power plants.

A significant physical force is exerted on a road on which a vehicle travels due to the movement of the vehicle. However, a physical force generated during driving of the vehicle is not utilized as energy and is wasted. Accordingly, an object of the disclosure is to provide a device generating electric power by using the energy of a vehicle traveling on the road.

SUMMARY

Provided is an apparatus for generating electric power by generating a change in a magnetic force while a pressing force from the vehicle is transmitted to a magnetic fluid storage unit and a magnetic fluid discharged from the magnetic fluid storage unit moves along a pipe unit and an induced electromotive force is generated in an induction coil unit outside the pipe unit.

Additional aspects will be set forth in part in the description which follows and, in part, will be apparent from the description, or may be learned by practice of the presented embodiments of the disclosure.

An apparatus for generating electric power from the motion of a vehicle of the disclosure includes: a magnetic fluid storage unit in which a magnetic fluid is stored and from which the magnetic fluid is discharged by a pressing force of the vehicle; a pipe unit through which the magnetic fluid discharged from the magnetic fluid storage unit moves; and an induction coil unit arranged to surround a circumference of the pipe unit so that an induced electromotive force is generated when the magnetic fluid moves.

In addition, the apparatus may include a container configured to contain the magnetic fluid storage unit, a pressurized portion provided on an upper side of the container and pressed against the vehicle and a pressing portion that receives a pressing force of the pressurized portion and presses the magnetic fluid storage unit.

In addition, the pressing portion may include a vertical portion having one end connected to a bottom surface of the pressurized portion and another end extending vertically downward, and a pressing plate coupled to the other end of the vertical portion to press the magnetic fluid storage unit, wherein when the pressurized portion is pressed by the vehicle and moves downward, the pressurized portion may come in contact with an upper end of the container and a distance in a downward moving direction may be adjusted.

In addition, the apparatus may include an elastic member for returning the pressurized portion to its original position when the pressing force is removed by the vehicle after the pressurized portion pressed by the vehicle is moved downward, wherein one end of the elastic member may be coupled to the bottom surface of the pressurized portion, and another end may be coupled to the container.

In addition, when the pressurized portion is returned to its original position by the elastic member, the pressing plate is caught on a support frame provided in the container and a distance moving upward may be regulated.

In addition, the apparatus may include an anti-slip device configured to prevent the pressurized portion from being pushed in a moving direction of the vehicle by a force of the vehicle when the pressurized portion is pressed by the vehicle.

In addition, the apparatus may include: a rotating shaft provided in the container; and a pressing force transmission member coupled to the rotating shaft to be rotated about the rotating shaft and having a first connecting portion connecting the pressurized portion to the rotating shaft and a second connecting portion connecting the rotating shaft to the pressing portion, wherein when the pressurized portion is pressed, the first connecting portion rotates with respect to the rotating shaft while moving downward, and the pressing portion presses the magnetic fluid storage unit while the second connecting portion moves upward. A first separation distance in a horizontal direction between the pressurized portion and the rotating shaft may be formed less than a second separation distance in a horizontal direction between the rotating shaft and the pressing portion, and thus, when the pressurized portion is pressed by the vehicle, an upward moving distance of the pressing portion may be greater than a downward moving distance of the pressurized portion.

In addition, one end of the pipe unit may be coupled to a discharge portion of the magnetic fluid storage unit, and another end of the pipe unit may be connected to an inlet portion through which a magnetic fluid flows back into the magnetic fluid storage unit to form a closed loop. A pump-type storage tank in which a magnetic fluid discharged from the magnetic fluid storage unit is stored may be provided adjacent to the discharge portion, and a check valve for preventing a reverse flow of the magnetic fluid may be provided between the pump-type storage tank and the discharge portion.

In addition, an expansion and contraction joint that expands and contracts according to the flow of the magnetic fluid may be provided between the discharge portion and the check valve.

In addition, the magnetic fluid storage unit may be pressurized by the vehicle and may be provided in plurality apart from each other at a certain interval, the pipe unit may include a plurality of connecting pipes respectively connecting the magnetic fluid storage units, and the induction coil unit is provided in each of the connecting pipes, so that when the vehicle pressurizes each of the magnetic fluid storage units and the magnetic fluid is discharged, the magnetic fluid may move to an adjacent magnetic fluid storage unit and generate electric power while passing through an induction coil unit provided in the connecting pipe.

In addition, assuming that a grid-like figure is formed by a plurality of first virtual lines apart from each other in a direction perpendicular to a traveling direction of the vehicle and a plurality of second virtual lines apart from each other in the traveling direction of the vehicle, the magnetic fluid storage unit may be provided at the intersection of the grid-like figure, and the connecting pipe may be provided at each side connecting the intersection.

In addition, the plurality of magnetic fluid storage units and the plurality of connecting pipes are connected to each other to form a closed loop, and the magnetic fluid and a certain gas may be included in the magnetic fluid storage units and the connecting pipes, so that the magnetic fluid may move when the vehicle is pressurized.

In addition, the magnetic fluid storage unit and the connecting tube may be contained in a case, and the magnetic fluid storage unit may include an exposed portion pressed by the vehicle and an embedded portion to which the connecting tube is connected, wherein the embedded portion and the connecting tube may be fixedly embedded in the case to form an integrated module in the form of a pad.

In addition, a protective layer for protecting the pad may be coupled to an upper surface of the module.

In addition, an anti-slip tape may be attached to the upper surface of the module to prevent slipping of the vehicle.

In addition, the apparatus may further include a rectifying unit configured to rectify a current generated by the magnetic fluid discharged from each of the magnetic fluid storage units.

In addition, the apparatus may further include an electrical equipment box configured to store power generated by the induction coil unit and transmit the power to the outside.

DETAILED DESCRIPTION

Hereinafter, various embodiments of the disclosure are described in connection with the accompanying drawings. Various embodiments of the disclosure may have various modifications and various embodiments, and specific embodiments are illustrated in the drawings and related detailed descriptions are described. However, this is not intended to limit the various embodiments of the disclosure to specific embodiments, and should be understood to include all modifications and/or equivalents or substitutes included in the spirit and technical scope of the various embodiments of the disclosure. Similar reference numerals are assigned to similar elements throughout the specification.

Expressions such as "include" or "may include" that may be used in various embodiments refer to corresponding functions, operations, or components, etc. disclosed, and do not limit additional one or more functions, operations, or components. Also, it will be further understood that the terms "comprises" and/or "comprising" when used in various embodiments of the disclosure, specify the presence of stated features, integers, steps, operations, elements, and/or components, but do not preclude the presence or addition of one or more other features, integers, steps, operations, elements, components, and/or groups thereof.

Further, if it is described that one element is "connected" to the other element, it is understood that the one element may be directly connected to or may directly access the other element but unless explicitly described to the contrary, another element may be "connected" between the elements. However, if it is described that one element is "directly connected to" or "directly accesses" the other element, it is understood that there are no other elements exists between them.

The terms used in various embodiments of the disclosure, only certain embodiments have been used to describe, is not intended to limit the various embodiments of the disclosure. As used herein, the singular forms "a," "an," and "the" are intended to include the plural forms as well, unless the context clearly indicates otherwise.

Unless otherwise defined, all terms (including technical and scientific terms) used herein have the same meaning as commonly understood by one of ordinary skill in the art to which various embodiments of the disclosure belong.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference will now be made in detail to embodiments of the disclosure, examples of which are illustrated in the accompanying drawings.

Figure 1:
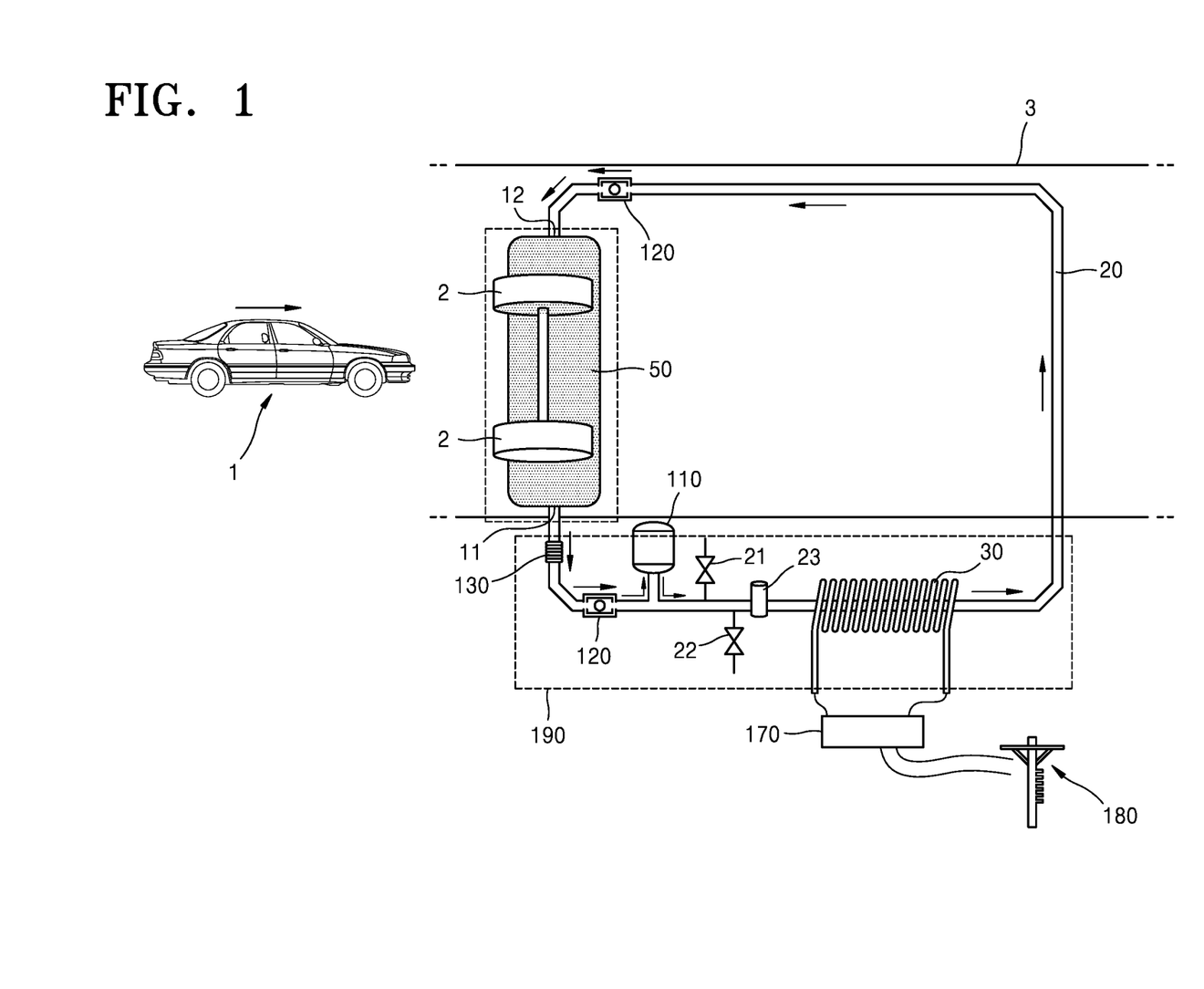
FIG. 1 is a conceptual diagram of an apparatus for generating electric power from the motion of a vehicle according to an embodiment.
Figure 2:
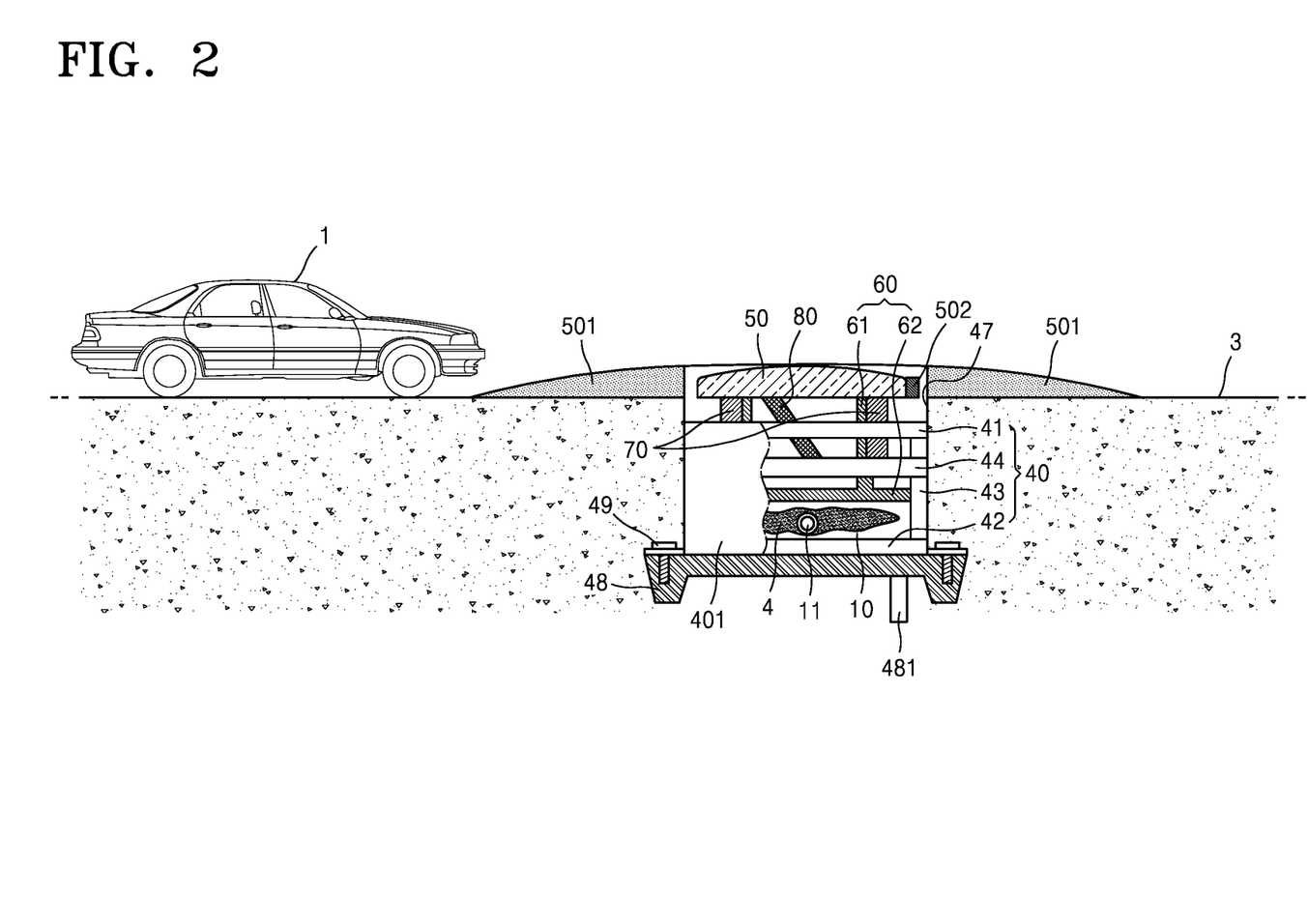
FIGS. 2 and 3 are cross-sectional views of a main portion of FIG. 1.
Figure 3:
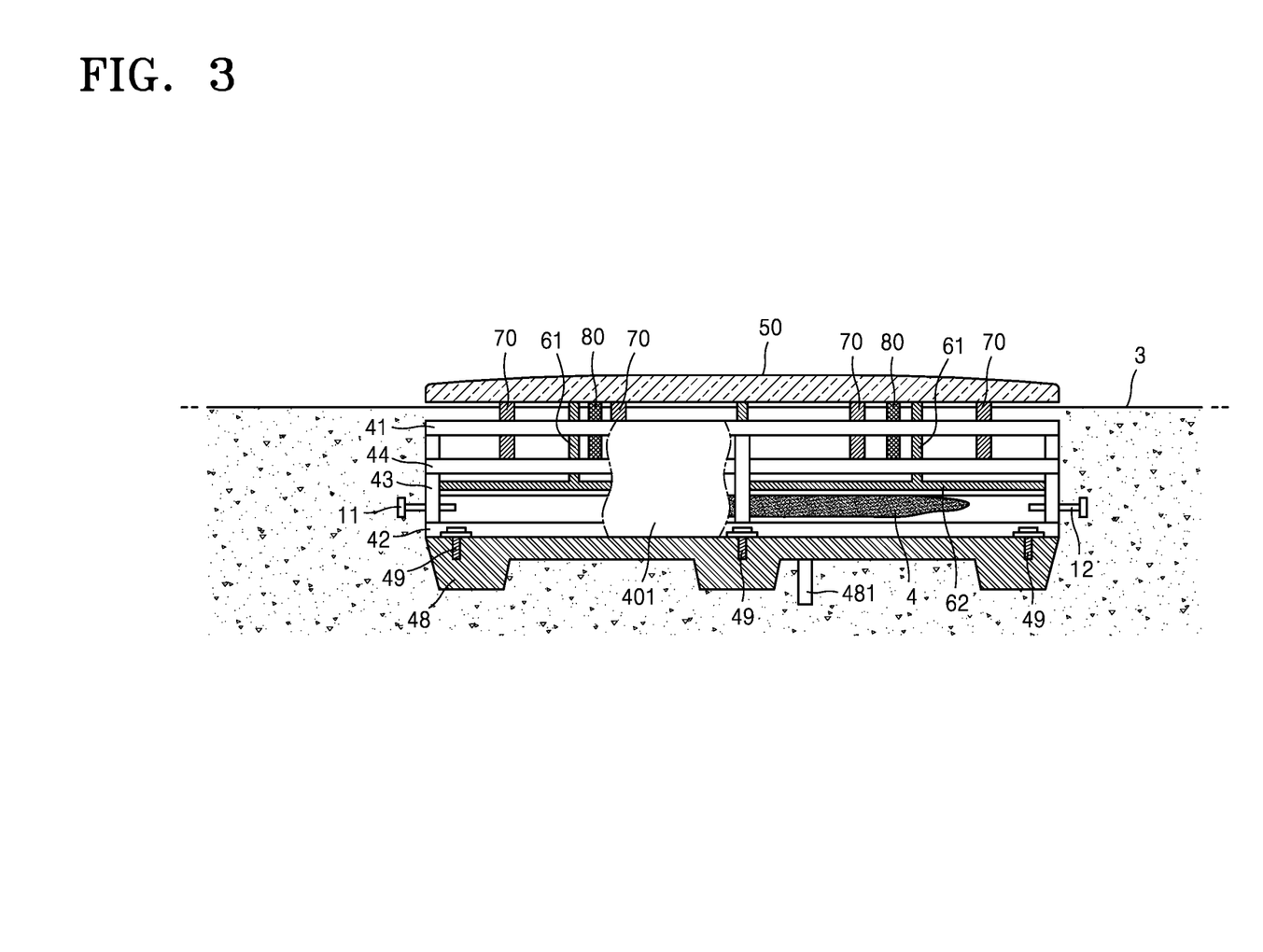
Figure 4:
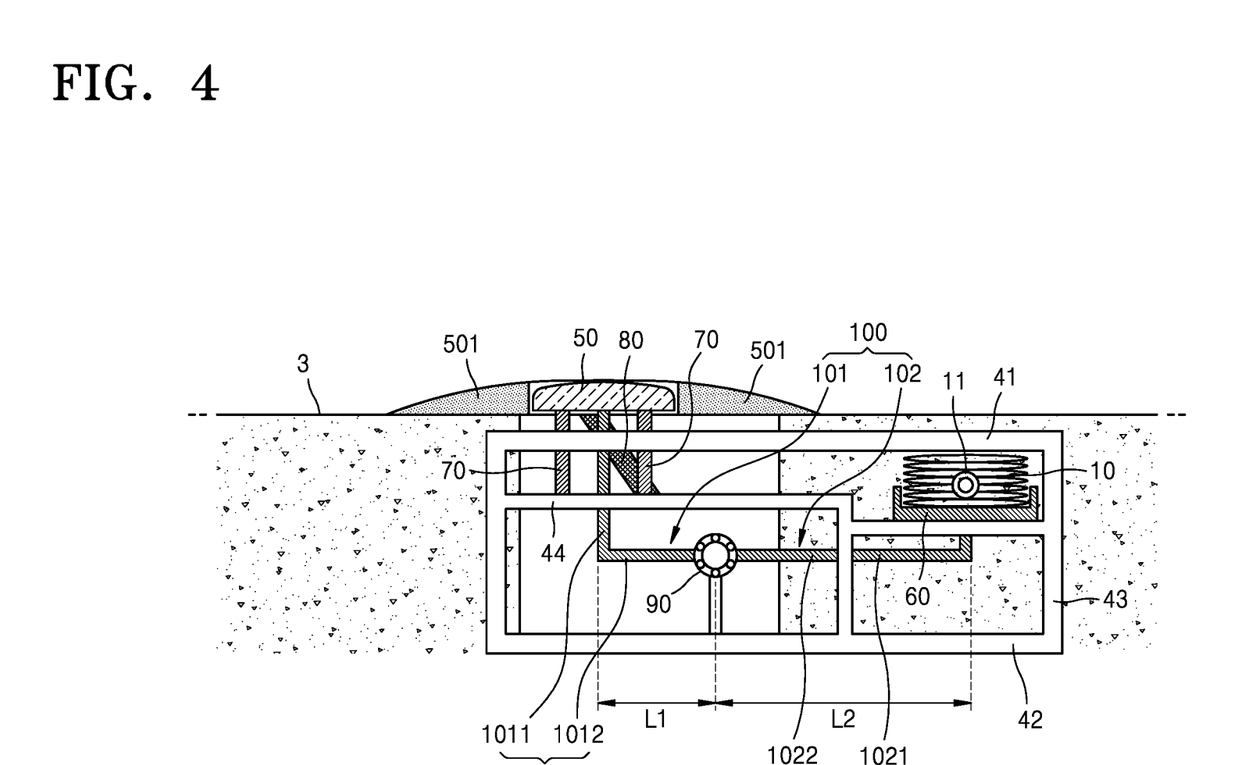
FIG. 4 is a cross-sectional view of an apparatus for generating electric power according to another embodiment.
Figure 5:
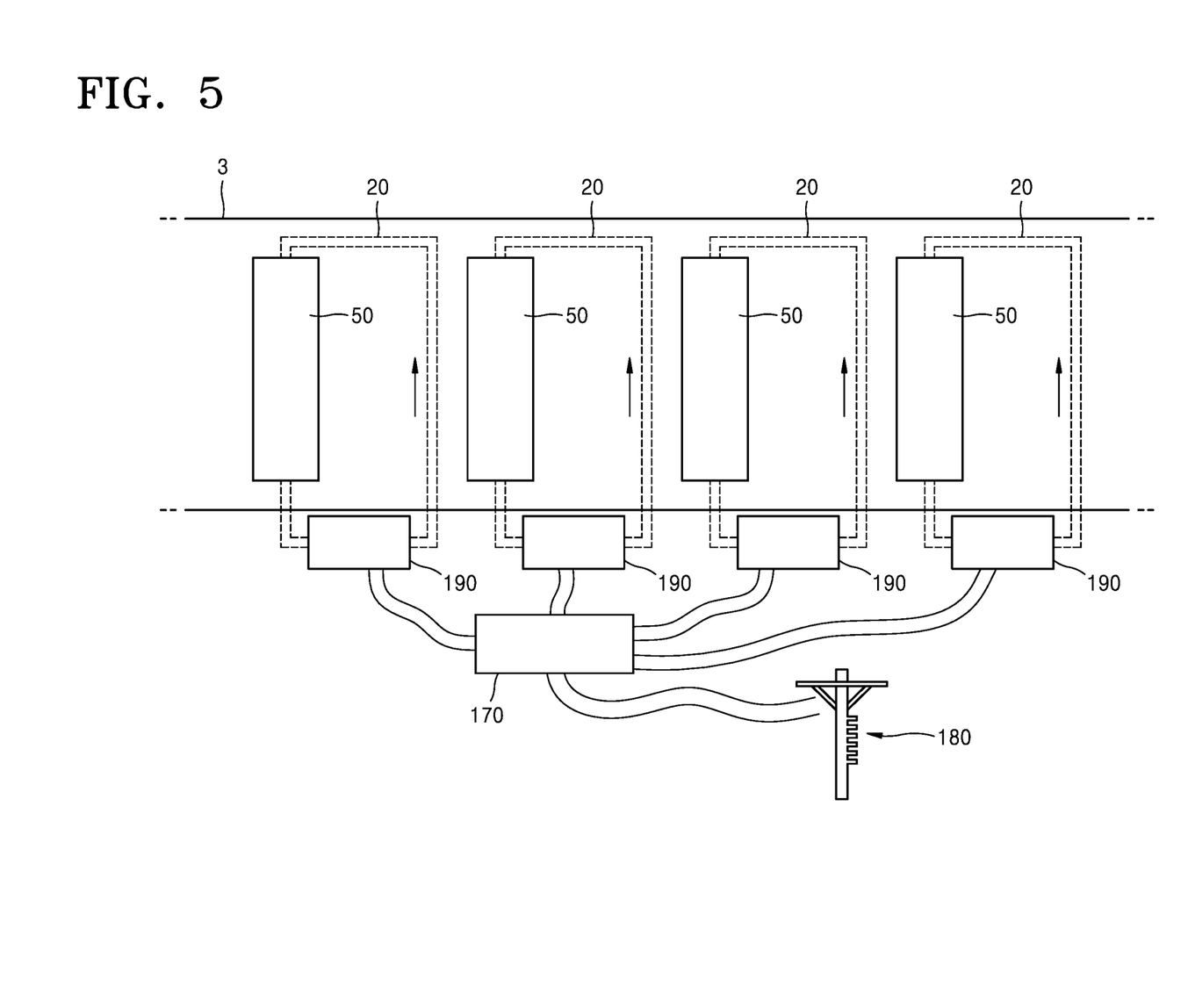
FIG. 5 is a schematic view illustrating a state in which the power generating apparatuses according to FIGS. 1 and 4 are collectively installed.
Figure 6:
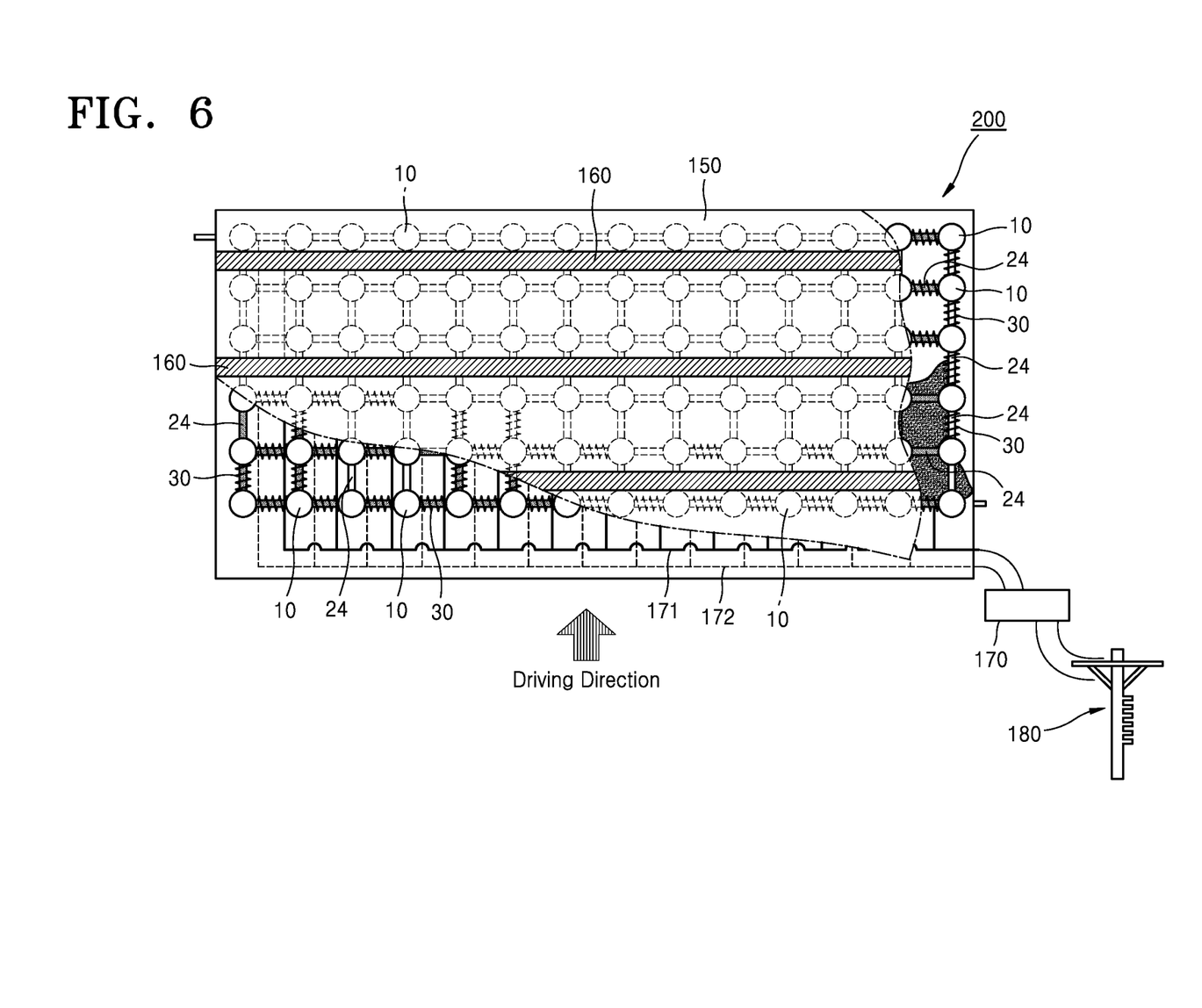
FIG. 6 is a plan view of a power generating apparatus according to another embodiment.
Figure 7:
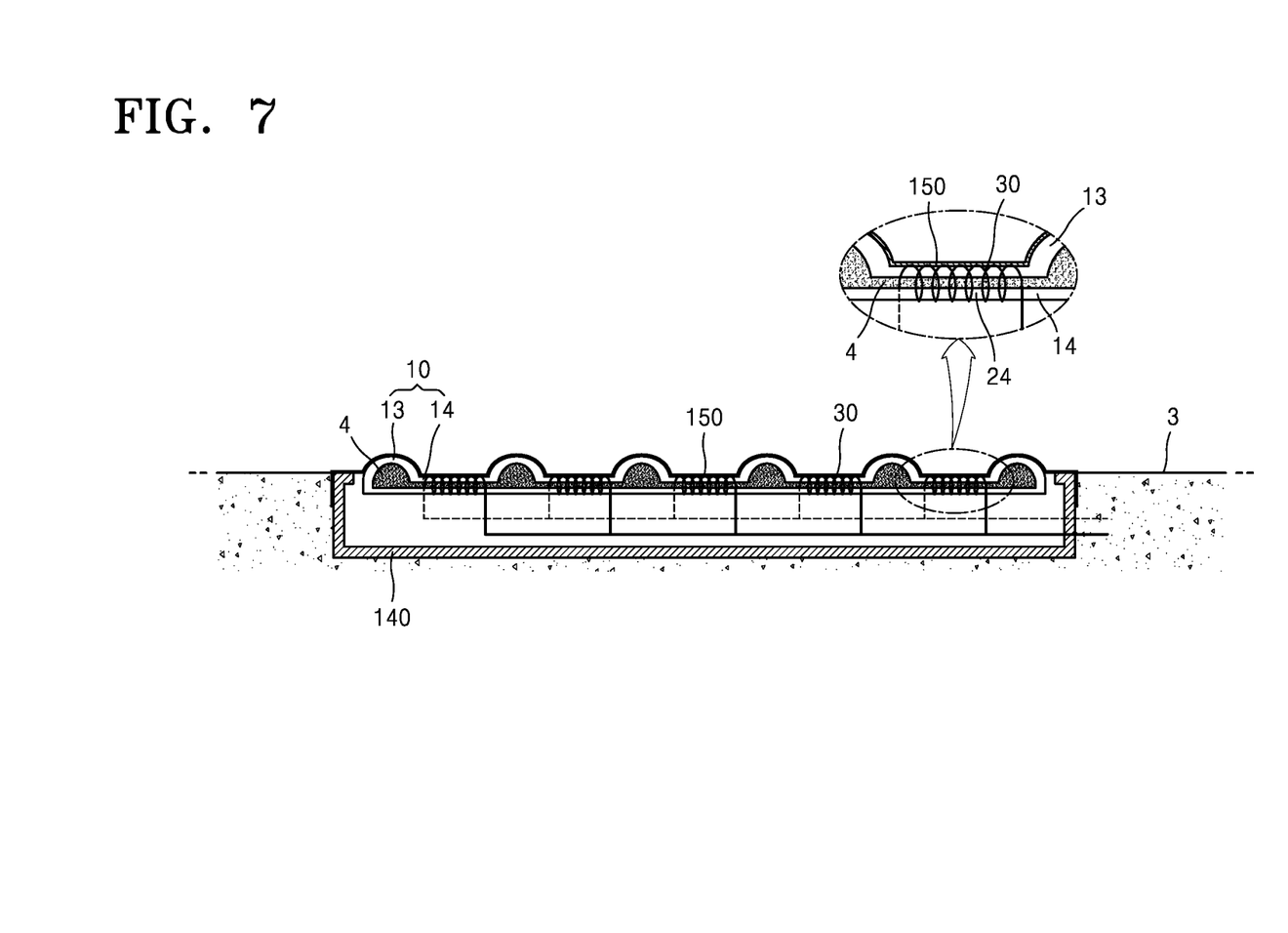
FIG. 7 is a cross-sectional view of a main portion of FIG. 6.
Figure 8:
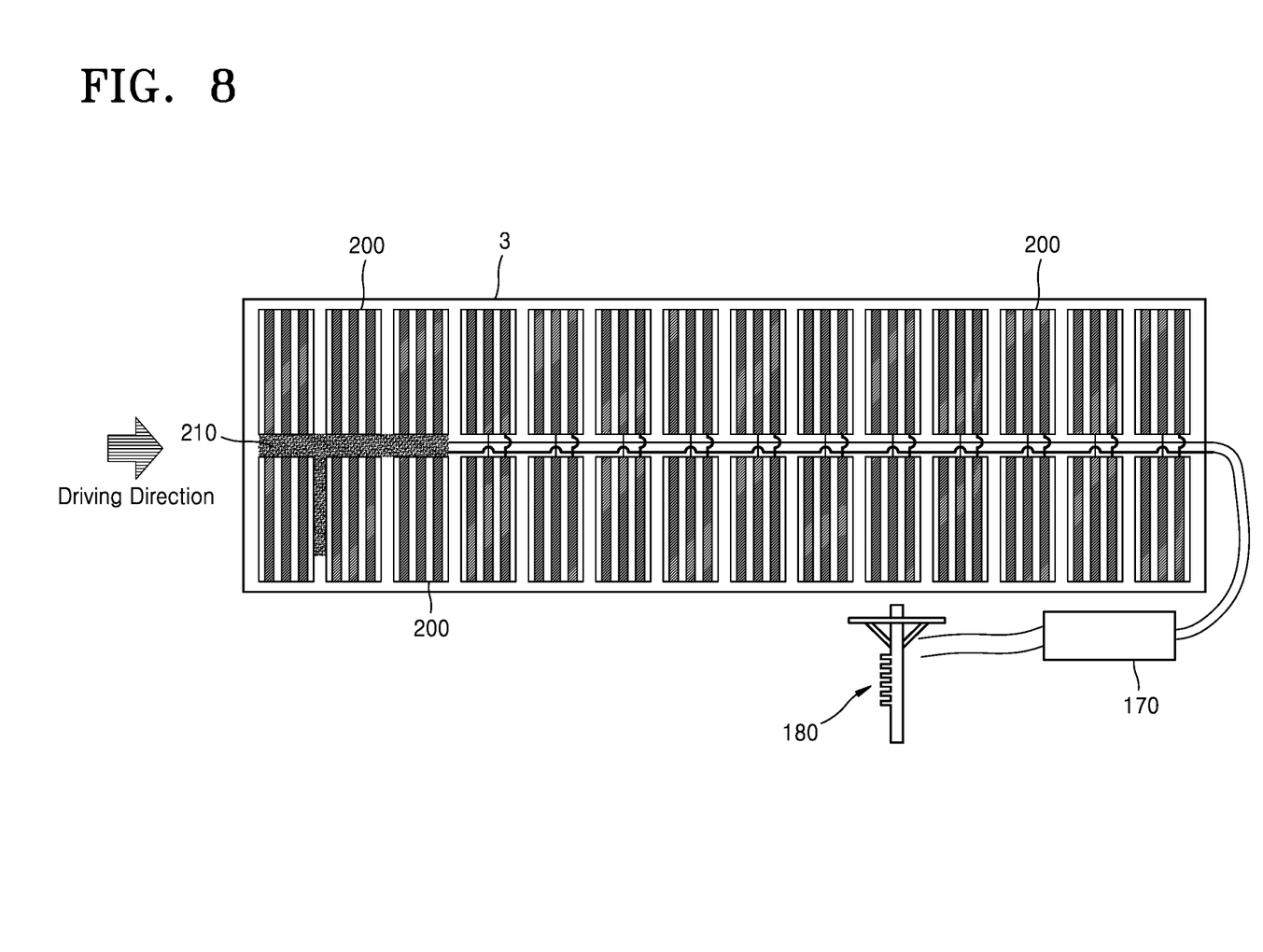
FIG. 8 is a schematic view illustrating a state in which the power generating apparatus according to FIG. 6 is collectively installed.
Figure 9:
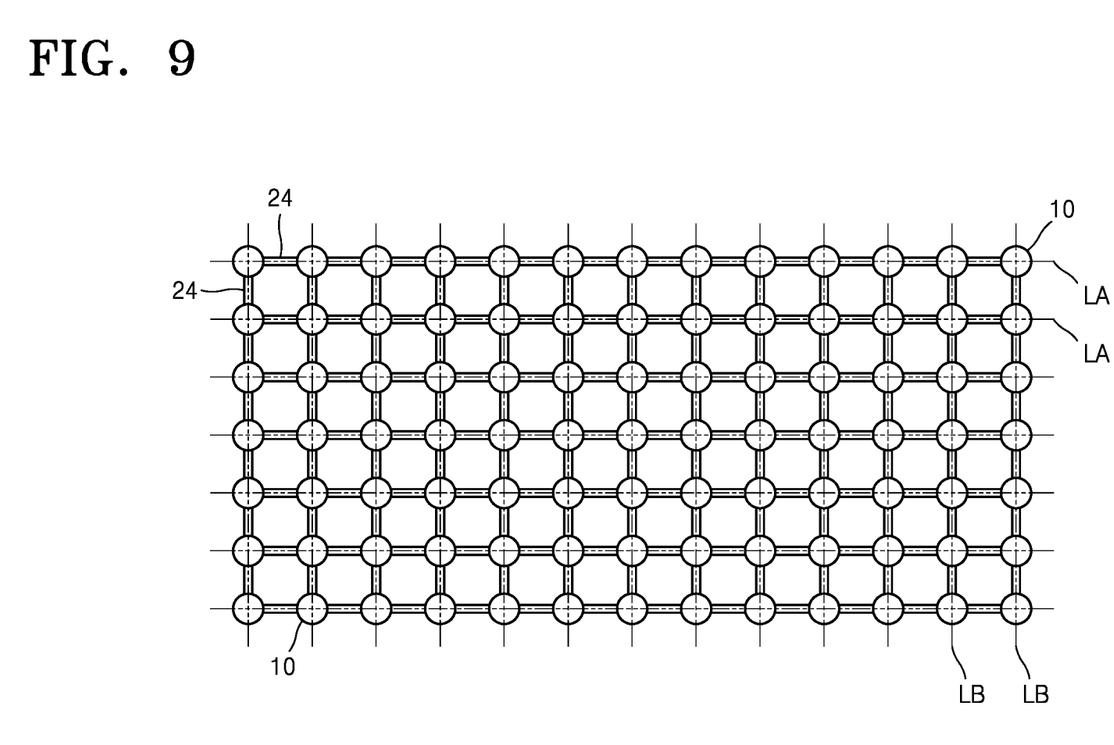
FIG. 9 is a view illustrating a state in which a magnetic fluid storage unit is arranged in a grid shape.

FIG. 1 is a conceptual diagram of an apparatus for generating electric power from the motion of a vehicle according to an embodiment, and FIGS. 2 and 3 are cross-sectional views of a main portion of FIG. 1. FIG. 4 is a cross-sectional view of an apparatus for generating electric power according to another embodiment, and FIG. 5 is a schematic view illustrating a state in which the power generating apparatuses according to FIGS. 1 and 4 are collectively installed. FIG. 6 is a plan view of a power generating apparatus according to another embodiment, and FIG. 7 is a cross-sectional view of a main portion of FIG. 6. FIG. 8 is a schematic view illustrating a state in which the power generating apparatus according to FIG. 6 is collectively installed, and FIG. 9 is a view illustrating a state in which a magnetic fluid storage unit is arranged in a grid shape.

The disclosure relates to an apparatus for generating electric power from the motion of a vehicle, and to an apparatus for generating electric power using kinetic energy of a vehicle and potential energy due to gravity. The vehicle may be, for example, a vehicle traveling on a road. However, in the disclosure, the vehicle is not limited to a vehicle traveling on a road. In the disclosure, the vehicle should be interpreted to have a meaning as an object capable of transmitting a pressing force during movement to a magnetic fluid storage unit in which a magnetic fluid is stored.

As shown in FIG. 1, the power generating apparatus according to an embodiment includes a magnetic fluid storage unit 10, a pipe unit 20, and an induction coil unit 30.

The magnetic fluid storage unit 10 is a portion in which a magnetic fluid 4 having magnetism is stored, and is configured so that the magnetic fluid 4 can be discharged by a pressing force of a vehicle 1. The magnetic fluid 4 is a fluid containing magnetic nanoparticles, and contains an appropriate amount of nanoparticles to flow through the pipe unit 20, wherein the nanoparticles induces a change in magnetic flux when the magnetic fluid 4 passes through the induction coil unit 30 according to a flow rate of the magnetic fluid 4. In the magnetic fluid 4, it is preferable that a pour point of a base solution is below a freezing point to prevent freezing in the winter season.

The magnetic fluid storage unit 10 is preferably made of a material having elasticity and elastic recovery. For example, the magnetic fluid storage unit 10 may employ a carbon black reinforced rubber material reinforced with tire cord to have durability despite repeated contraction and expansion for a long period of time. Alternatively, when made of a metal material, the magnetic fluid storage unit 10 may be manufactured in a bellows-type corrugated shape. However, the shape and material of the magnetic fluid storage unit 10 is not limited to the above, and may be implemented in various shapes and materials.

The pipe unit 20 is provided to move the magnetic fluid 4 discharged from the magnetic fluid storage unit 10. The pipe unit 20 has one end coupled to a discharge portion 11 of the magnetic fluid storage unit 10 and another end connected to an inlet portion 12 through which the magnetic fluid 4 flows back into the magnetic fluid storage unit 10 to form a closed loop. According to the present embodiment, a pump-type storage tank 110 in which the magnetic fluid 4 discharged from the magnetic fluid storage unit 10 is stored is provided adjacent to the discharge portion 11.

The magnetic fluid 4 discharged from the magnetic fluid storage unit 10 by the pressing force of the vehicle 1 flows into the pump-type storage tank 110, and is discharged from the pump-type storage tank 110 again when the pressing force is removed. The pump-type storage tank 110 includes a space in which the magnetic fluid 4 is stored, and divides the space by a partition wall and supports the partition wall with a spring having an elastic force, etc., so that when the magnetic fluid 4 flows in, may be implemented to store the magnetic fluid 4 as the partition wall retreats and to discharge the magnetic fluid 4 from the storage tank 110 by pushing the partition wall while the spring is restored when the pressing force is removed. However, the pump-type storage tank 110 is not limited to the above method.

A check valve 120 for preventing a reverse flow of the magnetic fluid 4 is provided in the pipe unit 20. The check valve 120 is provided between the pump-type storage tank 110 and the discharge portion 11 to allow the magnetic fluid 4 to flow in one direction. In addition, in the pipe unit 20, another check valve 120 is installed close to the inlet portion 12 of the magnetic fluid storage unit 10 to prevent the magnetic fluid 4 from flowing backward from the inlet portion 12 and moving.

In addition, an expansion and contraction joint 130 that expands and contracts according to the flow of the magnetic fluid 4 is provided between the discharge portion 11 and the check valve 120 in the pipe unit 20. The expansion and contraction joint 130 prevents the vibration of a pipe according to a sudden flow of the magnetic fluid 4 when the magnetic fluid 4 is discharged from the magnetic fluid storage unit 10. In addition, when the pipe unit 20 forms a closed loop, an elbow tube bent at an angle of about 45° to smooth the flow of the magnetic fluid 4 may be used for a curved portion. In addition, according to the present embodiment, the flow rate of the magnetic fluid 4 discharged from the pump-type storage tank 110 may be adjusted while passing through a pressure control valve 23 before flowing into the induction coil unit 30.

In addition, in the present embodiment, the pipe unit 20 includes an inlet valve 21 that fills the magnetic fluid 4 and prevents air from entering, and when air enters, exhausts the air and replaces and replenishes the magnetic fluid 4, and a discharge valve 22 capable of discharging the magnetic fluid 4 when necessary.

The induction coil unit 30 is arranged to surround the circumference of the pipe unit 20 so that an induced electromotive force is generated when the magnetic fluid 4 moves. According to the present embodiment, since the induction coil unit 30 disposed behind the pump-type storage tank 110 is installed adjacent to the pump-type storage tank 110, a flow change amount of the magnetic fluid 4 discharged from the storage tank 110 to generate an induced electromotive force can be sensitively detected. A current generated by the induction coil unit 30 is stored in an electrical equipment box 170 connected to the induction coil unit 30, and power stored in the electrical equipment box 170 is transmitted to external power transmission equipment 180. The electrical equipment box 170 may include a connection panel, an inverter, a power storage and transmission device, and other auxiliary equipment to store and transmit power.

The present embodiment includes a container 40, a pressurized portion 50, and a pressing portion 60 to contain and pressurize the magnetic fluid storage unit 10.

The container 40 is provided to contain the magnetic fluid storage unit 10. According to the present embodiment, an embedded groove 47 in which the container 40 is embedded is formed in a road 3 or the like, and the container 40 is contained and arranged inside the embedded groove 47. The container 40 includes an upper frame 41, a lower frame 42, and a side frame 43 forming an outer skeleton to contain the magnetic fluid storage unit 10, and further includes a support frame 44 installed in the middle of the upper frame 41 and the lower frame 42.

As shown in FIGS. 2 and 3, the upper frame 41, the lower frame 42, and the side frame 43 are respectively arranged at outer corners of a rectangular parallelepiped. The upper frame 41 is provided at a corner corresponding to an upper surface of the rectangular parallelepiped, and the lower frame 42 is provided at a corner corresponding to a lower surface of the rectangular parallelepiped. The side frame 43 is vertically arranged to connect the upper frame 41 to the lower frame 42, and is provided at a corner corresponding to a side surface of the rectangular parallelepiped.

In the present embodiment, when a width of the upper frame 41 and the lower frame 42 is greater, a strength may be reinforced by installing a plurality of side frames 43 in a portion corresponding to the side surface of the rectangular parallelepiped. In addition, as shown in FIG. 3, an outer cover 401 is configured to surround an outer side of the container 40 to further reinforce a strength of the container 40. The outer cover 401 may be made of, for example, an iron plate.

In addition, the container 40 is seated on a mounting portion 48 installed on the bottom of the embedded groove 47, and is firmly fixed by using a fixing member 49. The mounting portion 48 may be a structure such as a beam or concrete formed at the bottom of the embedded groove 47. Because the container 40 and mounting portion 48 are embedded in the embedded groove 47 formed by being depressed from a surface of the road 3, traveling of the vehicle 1 is not affected at all. A drain pipe 481 is coupled to a lower portion of the mounting portion 48 so that rainwater flowing into the embedded groove 47 can be discharged.

In the present embodiment, a width of the container 40 (a distance from the left to the right of the container 40 based on a driving direction of the vehicle 1 in FIG. 2) is formed to be about 30 cm to 60 cm, and a length of the container 40 (a distance from the left to the right of the container 40 based on FIG. 3) may be formed to be about 300 cm, which is about a width of one lane. In addition, a height of the container 40 may be manufactured to be about 50 cm to 60 cm.

The pressurized portion 50 is provided on an upper side of the container 40 to be pressed by the vehicle 1. In the present embodiment, an upper surface of the pressurized portion 50 is installed to protrude from the surface of the road 3 so that the pressurized portion 50 is pressed in contact with the vehicle 1. A guide jaw 501 is provided at the front and rear of the pressurized portion 50 so that the vehicle 1 can pass on a gentle slope. The guide jaw 501 and the pressurized portion 50 have a shape similar to that of a speed bump.

According to related regulations of the speed bump, because the maximum height of the speed bump is 10 cm, in consideration of this, the upper surface of the pressurized portion 50 is formed with a height of the highest point from the surface of the road 3 cm to about 5 cm, which is about 50% of a reference height of the speed bump, and a cover may be installed on the upper surface. In addition, the pressurized portion 50 is formed in an upward convex arcuate shape, and the angle formed by both ends of the arcuate shape with the surface of the road 3 is about 1.6° so as not to interfere with traveling of the vehicle 1. A width of the pressurized portion 50 (a distance from the left to the right of the pressurized portion 50 based on the traveling direction of the vehicle 1 in FIG. 2) is formed to be about 30 cm to 60 cm considering the size of a general tire.

The pressing portion 60 is provided to receive a pressing force of the pressurized portion 50 to press the magnetic fluid storage unit 10. According to the present embodiment, the pressing portion 60 includes a vertical portion 61 and a pressing plate 62.

One end of the vertical portion 61 is connected to a bottom surface of the pressurized portion 50, and another end extends vertically downward. The pressing plate 62 is coupled to the other end of the vertical portion 61 and has a plate shape to press the magnetic fluid storage unit 10. When the pressurized portion 50 is pressed by the vehicle 1 and moves downward, a distance that the pressurized portion 50 moves downward in contact with an upper end of the container 40 is regulated. According to the present embodiment, the pressurized portion 50 moves downward by the pressing force of the vehicle 1, and the bottom surface of the pressurized portion 50 moves downward to a point in contact with the upper frame 41, so that a downward movement distance is regulated by the upper frame 41. In the present embodiment, a distance between the bottom surface of the pressurized portion 50 and the upper frame 41 is set to about 5 cm.

According to the present embodiment, an elastic member 70 and an anti-slip device 80 are provided.

The elastic member 70 is provided to return the pressurized portion 50 to its original position when the pressing force by the vehicle 1 is removed after the pressurized portion 50 pressed by the vehicle 1 is moved downward, wherein one end of the elastic member 70 is coupled to the bottom surface of the pressurized portion 50, and another end is coupled to the container 40. As shown in FIGS. 2 and 3, a plurality of elastic members 70 are provided to quickly and easily return the pressurized portion 50. In the present embodiment, the elastic member 70 is made of a spring. An upper end of the spring is coupled to the bottom surface of the pressurized portion 50 and a lower end of the spring is coupled to the support frame 44. However, the elastic member 70 is not limited to the spring.

On the other hand, when the pressurized portion 50 is returned to the original position by the elastic member 70, the pressing plate 62 is caught on the support frame 44 provided in the container 40, and an upward movement distance is regulated. That is, when the spring pushes up the pressurized portion 50, the pressing plate 62 simultaneously rises while the vertical portion 61 coupled to the pressurized portion 50 rises, and when the pressing plate 62 comes into contact with the support frame 44, the rising is stopped, thereby controlling a rising distance. Accordingly, the upper surface of the pressurized portion 50 is prevented from protruding excessively from the surface of the road 3.

The anti-slip device 80 is provided to prevent the pressurized portion 50 from being pushed in a moving direction of the vehicle 1 by the force of the vehicle 1 when the pressurized portion 50 is pressed by the vehicle 1. The anti-slip device 80 may be, for example, a shock absorber. In addition, in spite of the anti-slip device 80, when the pressurized portion 50 is pushed somewhat by the force of the vehicle 1, a vibration-proof rubber 502 is installed on one side of the pressurized portion 50 to alleviate the impact on the pressurized portion 50.

FIG. 4 shows an apparatus for generating electric power from the motion of a vehicle according to another embodiment. In FIG. 4, the same reference numerals as in FIG. 1 are given to components that perform the same operations or functions as those of the embodiment of FIG. 1. In the embodiment of FIG. 4, repetitive description of components that perform the same operations or functions as those of the embodiment of FIG. 1 will not be given herein.

As shown in FIG. 4, according to the present embodiment, a configuration in which the pressing force of the vehicle 1 is transmitted to the magnetic fluid storage unit 10 is different from that of FIG. 1. In addition, according to the embodiment of FIG. 4, the degree of displacement by which the magnetic fluid storage unit 10 is pressed by the pressing force of the vehicle 1 may be increased.

In more detail, according to the present embodiment, the pressurized portion 50 is configured to be pressed through a pressing force transmission member 100 rotatably provided about a rotating shaft 90. To this end, according to the present embodiment, the rotating shaft 90 and the pressing force transmission member 100 are included.

The rotating shaft 90 is provided inside the container 40. The rotating shaft 90 is supported by the lower frame 42 of the container 40. The pressing force transmission member 100 includes a first connecting portion 101 connecting the pressurized portion 50 to the rotating shaft 90 and a second connecting portion 102 connecting the rotating shaft 90 to the pressing portion 60. The first connecting portion 101 includes a first vertical connecting portion 1011 extending vertically downward from the bottom surface of the pressurized portion 50 and a first horizontal connecting portion 1012 bent from the first vertical connecting portion 1011 and extending toward the rotating shaft 90. The second connecting portion 102 includes a second horizontal connecting portion 1022 extending from the rotating shaft 90 in the same direction as an extension direction of the first horizontal connecting portion 1012 and a second vertical connecting portion 1021 bent upwardly extending from the end of the horizontal connecting portion.

When the pressurized portion 50 is pressed, the first connecting portion 101 rotates with respect to the rotating shaft 90 while moving downward, and the pressing portion 60 presses the magnetic fluid storage unit 10 as the second connecting portion 102 moves upward. In more detail, the pressing portion 60 for pressing the magnetic fluid storage unit 10 is connected to an end of the second vertical connecting portion 1021, and the pressing portion 60 presses the magnetic fluid storage unit 10 while moving upward by the pressing force of the vehicle 1.

At this time, a first separation distance L1 in a horizontal direction between the pressurized portion 50 and the rotating shaft 90 is less than a second separation distance L2 in a horizontal direction between the rotating shaft 90 and the pressing portion 60. In more detail, when the pressurized portion 50 is pressed by the vehicle 1, the first separation distance L1 between a force point where the pressurized portion 50 applies a force to the first connecting portion 101 and the rotating shaft 90 is less than the second separation distance L2 between an action point where the second connecting portion 102 applies a force to the pressing portion 60 and the rotating shaft 90. With this configuration, when the pressurized portion 50 is pressed by the vehicle 1, a distance that the pressing portion 60 moves upward is greater than a distance that the pressurized portion 50 moves downward.

Electric power generated by the induction coil unit 30 depends on a volume change amount of the magnetic fluid 4 passing through the pipe unit 20. In other words, the amount of change in a magnetic field transmitted to the induction coil unit 30 is generated according to a flow rate and circulation speed of the magnetic fluid 4, thereby generating an induced electromotive force. The greater the change in flow rate and velocity, the greater the change in the magnetic field, thereby increasing power production.

According to the embodiment of FIG. 4, the amount of displacement by which the pressurized portion 50 moves in the vertical direction is maintained similarly to that of the embodiment of FIG. 1, but the amount of displacement of the pressing portion 60 pressing the magnetic fluid storage unit 10 is increased to increase the flow rate of the magnetic fluid 4 discharged through the magnetic fluid storage unit 10. This is an application of the principle of a lever, and when the second separation distance L2 from the rotating shaft 90 to the action point is greater than the first separation distance L1 between the rotating shaft 90 and the force point, the amount of vertical displacement on the action point side increases than on the force point side. By using this, a volume change of the magnetic fluid storage unit 10 may be doubled, and thus the power production may be increased. Assuming that a pressing force applied by the vehicle 1 is constant, when the position of the rotating shaft 90 moves toward the pressurized portion 50, the flow rate of the magnetic fluid 4 discharged from the magnetic fluid storage unit 10 may be increased.

The embodiment of FIG. 4, like the embodiment of FIG. 1, may include all configurations of the elastic member 70, the anti-slip device 80, the vibration-proof rubber 502, the electrical equipment box 170, and the like, and repetitive description thereof will not be given herein.

Hereinafter, the action of the apparatus for generating electric power from the motion of the vehicle 1 according to the embodiment of FIGS. 1 and 4 will be described in detail.

The power generating apparatus according to the disclosure is installed on a surface of the road 3 on which the vehicle 1 travels. The pressurized portion 50 protrudes from the surface of the road 3, and the components of the magnetic fluid storage unit 10, the pipe unit 20, the induction coil unit 30, the container 40, and the like are embedded under the surface of the road 3.

The magnetic fluid 4 is filled in the pipe unit 20, and is fully filled in the magnetic fluid storage unit 10 and the pipe unit 20 in a non-pressurized equilibrium state without the passage of the vehicle 1. A partition wall inside the pump-type storage tank 110 maintains an advanced state by an elastic body such as a spring. When the pressurized portion 50 is pressed while the vehicle 1 is traveling, the pressing force of the pressurized portion 50 is transmitted to the pressing portion 60 and the pressing portion 60 presses the magnetic fluid storage unit 10, and the stored magnetic fluid 4 is discharged.

The discharged magnetic fluid 4 moves along the pipe portion 20. At this time, the expansion and contraction joint 130 is installed in the pipe unit 20 adjacent to the magnetic fluid storage unit 10 to suppress vibration due to a sudden discharge of the magnetic fluid 4, and the magnetic fluid 4 is temporarily stored in the pump-type storage tank 110. When the magnetic fluid 4 is introduced into the storage tank 110, the partition wall retreats to secure a space in which the magnetic fluid 4 is stored.

When the pressing force of the vehicle 1 is removed, the magnetic fluid 4 stored in the storage tank 110 is discharged and moves along the pipe unit 20 again while the partition wall advances again, and as the magnetic fluid 4 passes through the induction coil unit 30, an induced electromotive force is generated according to the amount of change in the flow rate and speed of the magnetic fluid 4. The magnetic fluid 4 passing through the induction coil unit 30 moves along the pipe unit 20 and then again flows into the magnetic fluid storage unit 10. During this process, the magnetic fluid 4 is prevented from flowing backward by the check valve 120. The induced electromotive force generated by the induction coil unit 30 may be moved and stored in the electrical equipment box 170, and may be supplied to the outside through the power transmission equipment 180.

FIG. 5 is a view illustrating a state in which the plurality of power generating apparatuses according to FIGS. 1 and 4 are collectively installed. As shown in FIG. 5, the configuration of the induction coil unit 30 installed in the piping unit 20, the pump-type storage tank 110, and the like may be installed in a power generation equipment box 190 to facilitate maintenance. Each power generating apparatus is electrically connected to the electrical equipment box 170, and the electrical equipment box 170 may be implemented to collect and store power of each power production device and transmit the power to the power transmission equipment 180. In the case of collectively installing power generating apparatuses as described above, the power production efficiency may be improved while effectively using the area of the road 3.

FIG. 6 shows an apparatus for generating electric power from the motion of a vehicle according to another embodiment. In the present embodiment, the same reference numerals as in FIGS. 1 and 4 are given to components that perform the same operations or functions as those of the embodiment of FIGS. 1 and 4, and repetitive description thereof will not be given herein.

According to the embodiment of FIG. 6, the magnetic fluid storage unit 10 is pressurized by the vehicle 1 and provided in plurality apart from each other at a certain interval, and the pipe unit 20 includes a plurality of connecting pipes 24 respectively connecting the magnetic fluid storage units 10. The induction coil unit 30 is provided in each of the connecting pipes 24, and when the vehicle 1 pressurizes each of the magnetic fluid storage units 10 and the magnetic fluid 4 is discharged, the magnetic fluid 4 generates power while passing through the induction coil unit 30 provided in the connecting pipe 24 while moving to the adjacent magnetic fluid storage unit 10. According to the present embodiment, the magnetic fluid storage unit 10, the pipe unit 20, and the induction coil unit 30 are formed as an integrated module 200, and the magnetic fluid storage unit 10 directly receives a pressing force from the vehicle 1.

As shown in FIGS. 6 and 9, the magnetic fluid storage unit 10 and the connecting pipe 24 are arranged in a grid shape. In more detail, when setting a plurality of first virtual lines LA arranged to be apart from each other in a direction perpendicular to a traveling direction of the vehicle 1 and assuming that a grid-like figure is formed by a plurality of second virtual lines LB arranged to be apart from each other in the traveling direction of the vehicle 1, the magnetic fluid storage unit 10 is provided at the intersection of the grid-like figure, and the connecting pipe 24 is provided at each side connecting the intersection.

The magnetic fluid storage unit 10 is formed to have a certain space so that the magnetic fluid 4 can be contained therein. According to the present embodiment, the magnetic fluid storage units 10 are formed in a hemispherical shape. One module 200 in which the plurality of magnetic fluid storage units 10 are connected to each other by the connecting pipe 24 may be manufactured to have a width of about 150 cm, a length of about 60 cm, and a height of about 5 cm, and each of the hemispherical magnetic fluid storage units 10 may have a diameter of about 5 cm. The connecting pipes 24 respectively connecting the magnetic fluid storage units 10 may have an inner diameter of about 0.6 cm to 1.2 cm. The hemispherical magnetic fluid storage units 10 may be arranged to be apart from each other at a distance of 10 cm to 13 cm. In the present embodiment, although the magnetic fluid storage unit 10 is formed in a hemispherical shape, of course, the magnetic fluid storage unit 10 may be manufactured in a cylindrical shape, a hexahedral shape, etc. of a rubber material or an equivalent or higher material having elasticity and durability. However, when the magnetic fluid storage unit 10 is formed in a hemispherical shape, the disturbance to a driving feeling of the vehicle 1 can be minimized.

The connecting pipe 24 connects the magnetic fluid storage units 10 to each other. As described above, the magnetic fluid storage unit 10 is arranged in a grid shape, and the connecting pipe 24 connects the adjacent magnetic fluid storage units 10, so the magnetic fluid storage unit 10 is connected to the adjacent magnetic fluid storage unit 10 by two to four connecting pipes 24. The connecting tube 24 may be formed of a tube made of a stretchable silicone material.

The plurality of magnetic fluid storage units 10 and the plurality of connecting tubes 24 are connected to each other to form a closed loop, and the magnetic fluid 4 and a certain gas are contained in the magnetic fluid storage unit 10 and the connecting pipe 24, so that when the vehicle 1 is pressurized, the magnetic fluid 4 stored in each of the magnetic fluid storage units 10 may move to the adjacent magnetic fluid storage unit 10.

In more detail, the inside of the plurality of magnetic fluid storage units 10 and the plurality of connection tubes 24 is filled with the magnetic fluid 4, wherein about 80% to 85% of the total volume of the inside formed by the magnetic fluid storage units 10 and the connecting pipes 24 is filled with the magnetic fluid 4, and the rest is filled with air or nitrogen gas. When the vehicle 1 passes while pressing the plurality of magnetic fluid storage units 10, the gas provides a space in which the magnetic fluid 4 stored in each of the magnetic fluid storage units 10 may move to the adjacent magnetic fluid storage unit 10.

In addition, the gas helps to ensure elasticity and durability even when an overweight vehicle 1 presses the magnetic fluid storage unit 10 and the connecting pipe 24. The air or nitrogen gas is a compressible fluid, and when the magnetic fluid 4, which is an incompressible fluid, moves, the gas is compressed, and when the pressure of the vehicle 1 is released, the compression is released, and thus, the gas helps to restore the elastic fluid storage unit 10 and the connecting pipe 24 having elasticity to their original shapes. However, the air and nitrogen gas are preferably not excessively injected because they secure a space in which the magnetic fluid 4 may move in the magnetic fluid storage unit 10 and perform a function of assisting an elastic recovery force. In addition, in the magnetic fluid 4, it is preferable that a pour point of a base solution is below a freezing point to prevent freezing in the winter season.

As shown in FIG. 7, according to the present embodiment, the magnetic fluid storage unit 10 and the connecting pipe 24 may be contained in a case 140 and embedded in the road 3. In more detail, the magnetic fluid storage unit 10 includes an exposed portion 13 exposed to be pressurized by the vehicle 1, and an embedded portion 14 to which the connecting pipe 24 is connected. In the present embodiment, the exposed portion 13 is an upper portion protruding from a road surface in a hemispherical shape, and the embedded portion 14 is below the exposed portion 13, to which the connector 24 is connected, and is embedded in the case 140. The embedded portion 14 and the connecting pipe 24 are fixed and embedded in the case 140 to form the integrated module 200 in the form of a pad.

In the case 140, the magnetic fluid storage unit 10 to which the connector 24 is coupled is arranged on the inside, and the inside is filled with an epoxy molding liquid so that the connecting pipe 24 and the induction coil unit 30 are submerged and only the exposed portion 13 of the magnetic fluid storage unit 10 is exposed to the outside. At this time, an electric wire that draws out the power generated from the induction coil unit 30 extends to the outside of the case 140 while being submerged in the epoxy molding liquid. In the present embodiment, the epoxy molding solution is used to fix the magnetic fluid storage unit 10 to the case 140, but the disclosure is not limited thereto, and equivalent or higher materials may be used.

According to the present embodiment, a protective layer 150 and an anti-slip tape 160 may be attached to an upper surface of the module 200.

The protective layer 150 is coupled to the upper surface of the module 200 to protect the module 200. The protective layer 150 may protect all of the magnetic fluid storage unit 10, the connecting pipe 24, and the induction coil unit 30, and in particular, may protect the exposed portion 13 of the magnetic fluid storage unit 10 in direct contact with the vehicle 1. In addition, the protective layer 150 may be made of a durable material such as carbon fiber, and not only protect the upper surface of the module 200, but also improve a driving feeling of the vehicle 1.

The anti-slip tape 160 is attached to the upper surface of the module 200 to prevent slipping of the vehicle 1. According to the present embodiment, the anti-slip tape 160 is coupled to the upper surface of the protective layer 150, and a tape having an appropriate coefficient of friction required for the safety of the vehicle 1 is used.

Hereinafter, the operation of the power generating apparatus according to the embodiment of FIG. 6 will be described in detail.

When the vehicle 1 passes the upper portion of the integrated module 200 as described above, a wheel 2 of the vehicle 1 presses the magnetic fluid storage unit 10, and as the pressurized magnetic fluid storage unit 10 contracts, the magnetic fluid 4 stored therein is discharged. At this time, the discharged magnetic fluid 4 moves along the connecting pipe 24 to another adjacent magnetic fluid storage unit 10 that is not in contact with the wheel 2, and the magnetic fluid 4 passes through the induction coil unit 30 wound on the outside of the connecting pipe 24 and generates an induced electromotive force according to a change in magnetic flux. The power generated by the induction coil unit 30 is transmitted to the electrical equipment box 170 through wires 171 and 172, and the electrical equipment box 170 stores the power or transmits the power to the power transmission equipment 180.

On the other hand, when an induced electromotive force is generated in the induction coil unit 30 while the magnetic fluid 4 moves, because a reverse current (reverse voltage) may be generated depending on the position of the magnetic fluid storage unit 10, a rectifying unit for rectifying a current generated by the magnetic fluid 4 is provided. The rectifying unit includes a rectifying element or a rectifying circuit, and may adopt a generally known configuration, and may be provided between the induction coil unit 30 and the wires 171 and 172.

FIG. 8 shows a state in which a plurality of power generating apparatuses according to the embodiment of FIG. 6 are collectively installed. As shown in FIG. 8, a power generating apparatus is formed large enough to install a plurality of integrated modules 200, and may be configured to fix each module 200 to the case 140, and induce an induced electromotive force generated from each of the modules 200 to the electrical equipment box 170. When the plurality of integrated modules 200 are collectively installed, a filling material 210 may be used between each module 200. In the case of collectively installing power generating apparatuses as described above, the power production efficiency may be improved while effectively using the area of the road 3.

An apparatus for generating electric power from the motion of a vehicle according to the disclosure provides an eco-friendly power generating apparatus using energy of a vehicle that is dissipated on a road or the like.

In addition, the power generating apparatus according to the disclosure may generate power as a simple device without requiring various systems and ancillary facilities required to construct or operate a conventional power plant.

In addition, the power generating apparatus according to the disclosure may contribute to power energy supply by preventing environmental pollution and meeting increasing energy demand along with small and medium-sized power plants because additional fuel supply and combustion are not required for power generation.

In addition, the power generating apparatus according to the disclosure is very advantageous in terms of operation and maintenance costs because it does not require a regular operator and is simpler than a conventional power plant in terms of maintenance.

As mentioned above, although the disclosure has been described in detail with respect to preferred embodiments, the disclosure is not limited to the above embodiments, and various modifications may be provided without departing from the scope of the disclosure.

The invention claimed is:

1. An apparatus for generating electric power from a motion of a vehicle, the apparatus comprising:
   a magnetic fluid storage unit in which a magnetic fluid is stored and from which the magnetic fluid is discharged by a pressing force of the vehicle;
   a pipe unit through which the magnetic fluid discharged from the magnetic fluid storage unit moves;
   an induction coil unit arranged to surround a circumference of the pipe unit so that an induced electromotive force is generated when the magnetic fluid moves;
   a container configured to contain the magnetic fluid storage unit;
   a pressurized portion provided on an upper side of the container and pressed against the vehicle;
   a pressing portion configured to receive a pressing force of the pressurized portion and press the magnetic fluid storage unit;
   a rotating shaft provided in the container; and
   a pressing force transmission member coupled to the rotating shaft to be rotated about the rotating shaft and having a first connecting portion connecting the pressurized portion to the rotating shaft and a second connecting portion connecting the rotating shaft to the pressing portion,
   wherein, when the pressurized portion is pressed, the first connecting portion rotates with respect to the rotating shaft while moving downward, and the pressing portion presses the magnetic fluid storage unit while the second connecting portion moves upward, and
   a first separation distance in a horizontal direction between the pressurized portion and the rotating shaft is less than a second separation distance in a horizontal direction between the rotating shaft and the pressing portion, and thus,
   when the pressurized portion is pressed by the vehicle, an upward moving distance of the pressing portion is greater than a downward moving distance of the pressurized portion.

2. The apparatus of claim 1, wherein
   the pressing portion comprises a vertical portion having one end connected to a bottom surface of the pressurized portion and another end extending vertically downward, and a pressing plate coupled to the other end of the vertical portion to press the magnetic fluid storage unit, wherein, when the pressurized portion is pressed by the vehicle and moves downward, the pressurized portion comes in contact with an upper end of the container and a distance in a downward moving direction is adjusted.

3. The apparatus of claim 1, further comprising:
an elastic member configured to return the pressurized portion to its original position when the pressing force is removed by the vehicle after the pressurized portion pressed by the vehicle is moved downward,
wherein one end of the elastic member is coupled to a bottom surface of the pressurized portion, and another end is coupled to the container.

4. The apparatus of claim 3, wherein, when the pressurized portion is returned to its original position by the elastic member, the pressing plate is caught on a support frame provided in the container and a distance in an upward moving direction is adjusted.

5. The apparatus of claim 1, further comprising:
an anti-slip device configured to prevent the pressurized portion from being pushed in a moving direction of the vehicle by a force of the vehicle when the pressurized portion is pressed by the vehicle.

6. The apparatus of claim 1, wherein
one end of the pipe unit is coupled to a discharge portion of the magnetic fluid storage unit, and another end of the pipe unit is connected to an inlet portion through which a magnetic fluid flows back into the magnetic fluid storage unit to form a closed loop,
a pump-type storage tank in which a magnetic fluid discharged from the magnetic fluid storage unit is stored is provided adjacent to the discharge portion, and
a check valve configured to prevent a reverse flow of the magnetic fluid is provided between the pump-type storage tank and the discharge portion.

7. The apparatus of claim 1, wherein
the magnetic fluid storage unit is pressurized by the vehicle and is provided in plurality apart from each other at a certain interval,
the pipe unit comprises a plurality of connecting pipes respectively connecting the magnetic fluid storage units, and
the induction coil unit is provided in each of the connecting pipes,
and wherein, when the vehicle pressurizes each of the magnetic fluid storage units and the magnetic fluid is discharged, the magnetic fluid moves to an adjacent magnetic fluid storage unit and generates electric power while passing through an induction coil unit provided in the connecting pipe.

8. The apparatus of claim 7, wherein,
a grid-like figure is formed by a plurality of first virtual lines apart from each other in a direction perpendicular to a traveling direction of the vehicle and a plurality of second virtual lines apart from each other in the traveling direction of the vehicle,
the magnetic fluid storage unit is provided at an intersection of the grid-like figure, and the connecting pipe is provided at each side connecting the intersection.

9. The apparatus of claim 7, wherein
the plurality of magnetic fluid storage units and the plurality of connecting pipes are connected to each other to form a closed loop, and
the magnetic fluid and a certain gas are included in the magnetic fluid storage unit and the connecting pipe so that the magnetic fluid moves when the vehicle is pressurized.

10. The apparatus of claim 8, wherein
the magnetic fluid storage unit and the connecting tube are contained in a case, and
the magnetic fluid storage unit comprises an exposed portion pressed by the vehicle and an embedded portion to which the connecting tube is connected,
wherein the embedded portion and the connecting tube are fixedly embedded in the case to form an integrated module in the form of a pad.

11. The apparatus of claim 10, wherein a protective layer for protecting the pad is coupled to an upper surface of the module.

12. The apparatus of claim 10, wherein an anti-slip tape is attached to the upper surface of the module to prevent slipping of the vehicle.

13. The apparatus of claim 8, further comprising:
a rectifying unit configured to rectify a current generated by the magnetic fluid discharged from each of the magnetic fluid storage units.

14. The apparatus of claim 1, further comprising:
an electrical equipment box configured to store electric power generated by the induction coil unit and transmit the power to the outside.

15. An apparatus for generating electric power from a motion of a vehicle, the apparatus comprising:
a magnetic fluid storage unit in which a magnetic fluid is stored and from which the magnetic fluid is discharged by a pressing force of the vehicle;
a pipe unit through which the magnetic fluid discharged from the magnetic fluid storage unit moves; and
an induction coil unit arranged to surround a circumference of the pipe unit so that an induced electromotive force is generated when the magnetic fluid moves;
wherein one end of the pipe unit is coupled to a discharge portion of the magnetic fluid storage unit, and another end of the pipe unit is connected to an inlet portion through which a magnetic fluid flows back into the magnetic fluid storage unit to form a closed loop,
a pump-type storage tank in which a magnetic fluid discharged from the magnetic fluid storage unit is stored is provided adjacent to the discharge portion, and
a check valve configured to prevent a reverse flow of the magnetic fluid is provided between the pump-type storage tank and the discharge portion,
wherein an expansion and contraction joint configured to expand and contract according to a flow of the magnetic fluid is provided between the discharge portion and the check valve.

* * * * *